Patented Jan. 14, 1936

2,028,074

UNITED STATES PATENT OFFICE 2,028,074

METHOD OF PREPARING SECONDARY AROMATIC AMINES

Werner M. Lauter, Cuyahoga Falls, Ohio, assignor to Wingfoot Corporation, Wilmington, Del., a corporation of Delaware No Drawing. Application June 9, 1932, Serial No. 616,365

23 Claims. (Cl. 260—128)

This invention relates to a novel process of preparing secondary aromatic amines. More particularly, it pertains to a process of preparing secondary aromatic amines under conditions such that the times of reaction are lessened, the temperatures required to effect the reaction are decreased and the necessity of working under pressure is eliminated. Other advantages will be apparent from the succeeding description, in which are set forth the preferred methods of practicing the invention.

Heretofore in the preparation of secondary aromatic amines such as phenyl beta naphthylamine, it has been necessary to heat the reacting materials in an autoclave at temperatures ranging from 280 to 300 degrees C. for a period of from 8 to 40 hours in order to obtain sufficiently large yields to render the process commercially practicable. This long period of reaction, the high temperatures required and the use of an autoclave are all undesirable from the standpoints of efficiency, safety and economy.

This invention resides in the discovery that by the use as a catalyst of a dehydrating agent of the kind hereinafter described, secondary aromatic amines may be prepared by reacting hydroxy aromatic compounds with primary amines at substantially atmospheric pressures, at much lower temperatures and in much less time than has heretofore been possible. In many instances, all three features are found; in others, one or two of them attend the reaction. In all, however, the presence of a dehydrating agent materially helps the process of preparation. Temperatures ranging from 160 to 235 degrees C. are generally sufficient and in most cases times of reaction of only two to five hours are required.

Any organic or inorganic dehydrating agent which gives on ionization an electronegative group having one or more acid hydrogen atoms attached thereto or is of such a nature that it is capable of developing one or more such acid hydrogen atoms and which will not decompose on being subjected to the comparatively low temperatures required by the reaction is applicable for use in the practice of the invention, examples being found in boric acid; sodium, potassium and lithium bisulphates; sodium, potassium and lithium acid phosphates; the alkali metal salts of the acid oxalates, the corresponding pyrosulphates, etc. In general, these and related compounds are preferred, although it is in some cases feasible to use the zinc, aluminum and other salts. Of the alkali metal bisulphates, as is also true of the various other dehydrating agents mentioned, the sodium and potassium salts are preferable because of their low cost and availability.

No specific quantity of dehydrating agent is necessary, amounts varying from less than $\frac{1}{3}$ to over $\frac{2}{3}$ mol of agent per mol of primary amine being sufficient in most cases.

In carrying out the process, approximately molar quantities of a hydroxy aromatic compound and a primary amine may be mixed with one half mol, more or less, of dehydrating agent. The mixture should be refluxed at temperatures ranging from approximately 160 to approximately 235 degrees C. for a period of from two to five hours. During the reaction, it is desirable that the water formed be permitted to escape, although it is to be understood that this is not strictly necessary. This is, however, easily accomplished in most cases by allowing the water to pass off as vapor. The product may be purified by ordinary methods, as by washing with water and dilute hydrochloric acid and recrystallizing from an inert solvent such as alcohol.

Examples of hydroxy aromatic compounds capable of use in the invention are the naphthols, alpha and beta; the corresponding alkyl, nitro and halogen substituted naphthols; poly hydroxy benzenes such as catechol, resorcinol, phloroglucinol and hydroquinone; chlorine, bromine and other halogen substituted hydroxy benzenes; methyl, ethyl, propyl and other alkyl substituted hydroxy benzenes; the hydroxy biaryls; the hydroxy anthracenes, etc. In each of these compounds, it will be noticed, at least one hydroxy group is attached to the aryl nucleus.

Primary amines having boiling points such that the reaction may be carried out at the comparatively low temperatures obtaining during the process are suitable for use in the invention, examples being aniline; alkyl substituted phenyl amines such as the toluidines, xylidenes, and their homologues; amino diphenyls such as benzidine; naphthylamines such as alpha and beta naphthylamine; the amino phenols; halogen substituted naphthylamines, alpha and beta; halogen substituted phenyl amines; benzylamine; furfuryl amine; cyclohexylamine, and para phenetidine. With cyclohexylamine, furfuryl amine and certain other of the lower boiling amines it is necessary to take precautions in their addition to the hydroxy compound, one suitable method being to add them slowly, drop by drop, as by a separatory funnel.

Illustrative of the invention is the preparation of phenyl beta naphthylamine set forth below.

One and one half mols of beta naphthol, one and one half mols of aniline and approximately one half mol of KHSO4 are heated at atmospheric pressure at a temperature of 180 to 190 degrees C. for approximately three hours with proper precautions to permit the escape of the water formed during the reaction. The crude product is purified by successively washing it with water, dilute sodium hydroxide and dilute hydrochloric acid, a yield of approximately 93% phenyl beta naphthylamine resulting. When recrystallized from alcohol, a melting point of approximately 108 degrees C. is obtained. From this it is readily seen that the applicant has invented a process simple in operation, highly efficient, and low in operating cost.

In another embodiment of the invention, substantially gram molar quantities of para toluidine and beta naphthol are refluxed with 50 grams of KHSO4 for a period of approximately four hours at a temperature of 185 to 200 degrees C. The product, para tolyl beta naphthylamine, is purified in a manner similar to that outlined above in the case of phenyl beta naphthylamine. The compound, on recrystallization from alcohol, has a melting point in the neighborhood of 103 degrees C.

Ortho tolyl beta naphthylamine is prepared similarly from approximately one and one half gram molar proportions of ortho toluidine and beta naphthol, refluxed approximately five hours at 190 to 196 degrees C. in the presence of 100 grams of KHSO4. Similarly, beta beta dinaphthylamine is prepared by heating one half mol in grams of beta naphthylamine with one half mol of beta naphthol in the presence of 25 grams KHSO4 for four and one half hours at a temperature of from 210 to 235 degrees C. When purified, the beta beta dinaphthylamine melts at 171–172 degrees C.

Diphenyl para phenylene diamine may likewise be prepared by the process of the invention, although a somewhat longer time is required for the reaction. In doing so, 165 grams of hydroquinone are heated with an excess of aniline, say 396 grams, in the presence of 195 grams of NaHSO4 for a period of twenty four hours at 195 to 205 degrees C. The product, diphenyl para phenylene diamine, is obtained in substantially pure form by washing with water and dilute hydrochloric acid and recrystallizing from alcohol.

In still another embodiment of the invention approximately gram molar quantities of cresylic acid (a mixture of cresols, principally meta cresol) and aniline are refluxed with 50 grams of KHSO4 at atmospheric pressure for a period of approximately seven hours at a temperature of approximately 200 degrees C. The crude product is purified by washing it with water in dilute hydrochloric acid, after which it is taken up in benzene, dried and dry hydrogen chloride passed therethrough. The amine hydrochloride separates as a powder which upon the addition of water decomposes, giving a fair yield of tolyl phenyl amine, an oily substance. If the reaction is carried out under pressure a higher yield results.

The invention is also applicable to the lower boiling amines. In preparing cyclo hexyl beta naphthylamine, 144 grams (1 mol) of beta naphthol and 50 grams of NaHSO4 are heated together with stirring to a temperature of around 175 degrees C. 99 grams (1 mol) of cyclo hexyl amine (boiling point 134 degrees C.) are added dropwise during a period of about 2½ hours. A small portion of cyclo hexyl amine may distill out but may be gathered in an air cooled condenser and returned. After all the cyclo hexyl amine is added, the mixture is heated for approximately five hours at temperatures ranging from 185 to 195 degrees C. The crude product, a brown oil, may be purified by stirring thoroughly with 1 liter of water and 55 cc. of concentrated hydrochloric acid after which the acid solution should be decanted and treated with 1 liter of water and 45 grams in NaOH. The crude residue and brown oil is then stirred with about 300 cc. of alcohol from which a solid separates. The mixture is then heated until the solid returns to solution. Upon cooling, the cyclo hexyl beta naphthyl amine crystallized out, giving a yield of around 50%. The product has a melting point of approximately 74 degrees C.

In like manner, furfuryl beta naphthyl amine may be prepared by reacting molar quantities of furfuryl amine and beta naphthol in the presence of approximately 50 grams of NaHSO4, the furfuryl amine being added drop by drop to a mixture of beta naphthol and NaHSO4 maintained at a temperature of around 170 degrees C. After heating for about eight hours at temperatures ranging from 180 to 190 degrees C. a yield of around 50% of furfuryl beta naphthylamine is obtained. The product is in the form of a viscous liquid boiling at 162 to 168 degrees C. at a pressure of 42 to 45 mm.

Further illustrative of the use of dehydrating agents which on ionization give an electronegative group having one or more acid hydrogen atoms attached thereto is the preparation of phenyl beta naphthylamine from beta naphthol and aniline in the presence of sodium acid oxalate. Molar quantities of beta naphthol and aniline and 50 grams of sodium acid oxalate are heated at a temperature ranging from 180 to 190 degrees C. for approximately six hours with the precautions elsewhere referred to as to the escape of the water formed during the reaction. The crude product may be purified as above described, a high grade of phenyl beta naphthylamine having a melting point of 103 to 106 degrees C. being obtained.

The acid phosphates are likewise applicable for use in the practice of the invention. In one embodiment, beta naphthol and aniline in molar quantities are heated with 50 grams of $$NaH_2PO_4.1H_2O$$

for about six hours at temperatures of 185 to 195 degrees C. The crude product when purified, gives a yield of better than 50% phenyl beta naphthylamine having a melting point of 103 to 106 degrees C.

Boric acid, a compound which is capable of developing one or more acid hydrogen atoms attached to the electronegative group, also acts as a catalyst in the preparation of secondary aromatic amines. Para hydroxy diphenyl amine is prepared by heating aniline and hydroquinone in the proportions, in one instance, of 2½ mols to 1 mol, respectively, with 50 grams of boric acid for about 18 hours at temperatures of 180 to 195 degrees C. A yield is obtained of about 80–85 grams of para hydroxy diphenyl amine having a melting point of 55–58 degrees C. On recrystallization, a melting point of 70 degrees C. is obtained. Similarly, molar quantities of aniline and beta naphthol heated with 50 grams of boric acid for about 3 hours at a temperature of only 155 to 165 degrees C. give a yield of approximately 40% phenyl beta naphthylamine which, when recrystallized from alcohol, has a melting point of 103 to 106 degrees C.

Without the addition of a dehydrating agent, it is necessary, in order to prepare these compounds, to heat the primary amine with the naphthol under high pressure at considerably higher temperatures and for much longer periods of time. From these illustrations, it will be seen that in the process of the invention, the reactions proceed with smoothness and a higher degree of efficiency, that the products may be purified easily, and that the yields are within the range of commercial feasibility. The use of complicated apparatus is eliminated. The technical precautions in the operation of the process are greatly lessened. These considerations, together with the comparative speed of the reaction, make the process a particularly desirable one from a commerical standpoint. In certain cases, such as in the preparation of diphenyl para phenylene diamine, the use of pressure will be found desirable.

By the expression "substantially anhydrous" employed herein is meant that the reaction is carried out in the presence of no water other than that formed during the reaction and that small amount which is sometimes present in commercially pure starting materials. Since a large part of the water formed during the reaction normally escapes immediately upon formation, there will probably be not more than 1 or 2% of water, if that much, present at any time.

The invention is in no way limited to the specific illustrations or to the specific steps outlined above, for numerous variations in the details of the operation and even in the chemicals employed may be made by persons skilled in the art without departing from the spirit thereof. It will therefore be understood that the invention embraces these and such other modifications and changes as may be desirable to adapt it to varying conditions and uses. It is intended that the patent shall cover, by suitable expression in the appended claims, whatever features of patentable novelty reside in the invention.

What I claim is:

1. The process of preparing secondary aromatic amines which comprises reacting a hydroxy aromatic compound in which at least one hydroxyl group is attached to the aromatic nucleus with a primary cyclic amine in the presence of an alkali metal bisulphate.

2. The process of preparing secondary aromatic amines which comprises reacting a mono hydroxy aromatic compound in which the hydroxyl group is attached directly to the aryl nucleus with a primary cyclic amine in the presence of an alkali metal bisulphate.

3. The process of preparing secondary aromatic amines which comprises reacting a hydroxy aromatic compound in which at least one hydroxyl group is attached directly to the aryl nucleus with a primary aryl amine in the presence of an alkali metal bisulphate.

4. The process of preparing secondary aromatic amines which comprises reacting a hydroxy aromatic compound in which at least one hydroxyl group is attached directly to the aryl nucleus with a primary phenyl amine in the presence of an alkali metal bisulphate.

5. The process of preparing secondary aromatic amines which comprises reacting in the presence of an alkali metal bisulphate, a hydroxy aromatic compound in which at least one hydroxy group is attached to the aromatic nucleus and selected from a group consisting of naphthols, hydroxy phenols and alkyl phenols with a primary amine selected from a group consisting of aniline, alkyl phenyl amines, naphthylamines, cyclohexyl amine, furfuryl amine, benzyl amine, para phenetidine, amino biphenyls, amino phenyls, halo-naphthylamines and halophenyl.

6. The process of preparing secondary aromatic amines which comprises reacting a naphthol with an alkyl phenyl primary amine in the presence of an alkali metal bisulphate.

7. The process of preparing phenyl beta naphthylamine which comprises reacting beta naphthol with aniline in the presence of an alkali metal bisulphate.

8. The process of preparing phenyl beta naphthylamine which comprises reacting beta naphthol with aniline in the presence of an alkali metal bisulphate under conditions such that the greater part of the water formed during the reaction may be permitted to escape.

9. The process of preparing secondary aromatic amines which comprises reacting a naphthol with a primary cyclic amine in the presence of an alkali metal bisulphate.

10. The process of preparing secondary aromatic amines which comprises reacting a primary cyclic amine and a hydroxy aromatic compound in which at least one hydroxy group is attached to the aromatic nucleus, under substantially anhydrous conditions and in the presence of an alkali metal bisulphate.

11. The process of preparing a phenyl naphthylamine which comprises reacting a primary phenyl amine with a naphthol in the presence of an alkali metal acid phosphate.

12. The process of preparing a phenyl naphthylamine which comprises reacting a primary phenyl amine with a naphthol in the presence of an alkali metal pyrosulphate.

13. The process of preparing secondary aromatic amines which comprises reacting a primary cyclic amine and a hydroxy aromatic compound in which at least one hydroxyl group is attached to the aromatic nucleus, under substantially anhydrous conditions and in the presence of an alkali metal pyrosulphate.

14. The process of preparing secondary aromatic amines which comprises reacting a primary cyclic amine and a hydroxy aromatic compound in which at least one hydroxyl group is attached to the aromatic nucleus, under substantially anhydrous conditions and in the presence of an alkali metal acid phosphate.

15. The process of preparing secondary aromatic amines which comprises reacting a phenol with a primary cyclic amine in the presence of an alkali metal bisulphate.

16. The process of preparing a secondary aromatic amine which comprises adding an alkali metal bisulphate to a mixture of a phenol and a primary cyclic amine and heating the mixture at atmospheric pressure to a temperature between approximately 160 degrees C. and approximately 235 degrees C.

17. The process of preparing secondary aromatic amines which comprises reacting a mixture of a primary cyclic amine and an aromatic hydroxy compound of the benzene and naphthalene series in which at least one hydroxyl group is attached to the aromatic nucleus, under substantially anhydrous conditions and in the presence of a dehydrating agent selected from a group consisting of alkali metal bisulphates, alkali metal pyrosulphates and alkali metal acid phosphates.

18. The process of preparing secondary aromatic amines which comprises reacting a mixture of a primary aromatic amine and an aromatic hydroxy compound of the benzene and naphthalene series in which at least one hydroxyl group is attached to the aromatic nucleus, under substantially anhydrous conditions and in the presence of a dehydrating agent selected from a group consisting of alkali metal bisulphates, alkali metal pyrosulphates and alkali metal acid phosphates.

19. The process of preparing phenyl beta naphthylamine which comprises reacting a mixture of beta naphthol and aniline in the presence of a dehydrating agent selected from a group consisting of alkali metal bisulphates, alkali metal pyrosulphates and alkali metal acid phosphates.

20. The process of preparting a secondary naphthylamine which comprises adding to a mixture of about molecular equivalent proportions of a naphthol and a primary cyclic amine from approximately one third to approximately two thirds of a molecular equivalent of a dehydrating agent selected from a group consisting of alkali metal bisulphates, alkali metal pyrosulphates and alkali metal acid phosphates, heating the mixture to a temperature at which water is formed, and eliminating the greater part of the water by distillation during the course of the reaction.

21. The process of preparing a phenyl naphthylamine which comprises adding to a mixture of about molecular equivalent proportions of a naphthol and a primary phenyl amine from approximately one third to approximately two thirds of a molecular equivalent of a dehydrating agent selected from a group consisting of alkali metal bisulphates, alkali metal pyrosulphates and alkali metal acid phosphates, heating the mixture to a temperature at which water is formed, and eliminating the greater part of the water by distillation during the course of the reaction.

22. The process of preparing a secondary naphthylamine which comprises adding a dehydrating agent selected from a group consisting of alkali metal bisulphates, alkali metal pyrosulphates and alkali metal acid phosphates to a mixture of a naphthol and a primary cyclic amine and heating the mixture at atmospheric pressure to a temperature between approximately 160° C. and approximately 235° C.

23. The process of preparing secondary aromatic amines which comprises reacting under substantially anhydrous conditions and in the presence of a dehydrating agent selected from a group consisting of alkali metal bisulphates, alkali metal pyrosulphates and alkali metal acid phosphates, a hydroxy aromatic compound in which at least one hydroxy group is attached to the aromatic nucleus and selected from a group consisting of naphthols, hydroxy phenols and alkyl phenols, with a primary amine selected from a group consisting of aniline, alkyl phenyl amines, naphthylamines, cyclohexylamine, furfuryl amine, benzyl amine, para phenetidine, amino biphenyls, amino phenols, halo-naphthylamines, and halo-phenylamines.

WERNER M. LAUTER.

CERTIFICATE OF CORRECTION.

Patent No. 2,028,074.

January 14, 1936.

WERNER M. LAUTER.

It is hereby certified that error appears in the printed specification of the above numbered patent requiring correction as follows: Page 3, second column, line 8, claim 5, for "phenyls" read phenols; line 9, same claim, after "phenyl" and before the peroid insert amines; page 4, first column, line 20, claim 20, for "preparting" read preparing; and that the said Letters Patent should be read with these corrections therein that the same may conform to the record of the case in the Patent Office.

Signed and sealed this 3rd day of March, A. D. 1936.

(Seal)

Leslie Frazer
Acting Commissioner of Patents.